US012715453B2

(12) United States Patent
Hu et al.

(10) Patent No.: US 12,715,453 B2
(45) Date of Patent: Aug. 25, 2026

(54) NETWORK HAVING SOFTWARE ENTITIES FOR ACTUATING CONTROLLERS

(71) Applicant: GM Global Technology Operations LLC, Detroit, MI (US)

(72) Inventors: Yiran Hu, Shelby Township, MI (US); Frank Ghenassia, Ramat Gan (IL); Scott A. Rush, White Lake Township, MI (US); Cheryl A. Williams, Howell, MI (US); Abdelhalim Ragab, Canton, MI (US); Sherif Aly, West Bloomfield, MI (US); David M. Frazier, Sterling Heights, MI (US); Jorge R. Flores, Macomb, MI (US)

(73) Assignee: GM Global Technology Operations LLC, Detroit, MI (US)

(*) Notice: Subject to any disclaimer, the term of this patent is extended or adjusted under 35 U.S.C. 154(b) by 235 days.

(21) Appl. No.: 18/393,014

(22) Filed: Dec. 21, 2023

(65) Prior Publication Data

US 2025/0206321 A1 Jun. 26, 2025

(51) Int. Cl.

| | |
|---|---|
| ***B60W 50/00*** | (2006.01) |
| ***B60W 10/30*** | (2006.01) |
| ***B60W 30/12*** | (2020.01) |
| ***B60W 30/14*** | (2006.01) |

(52) U.S. Cl.

CPC ........ *B60W 50/0098* (2013.01); *B60W 10/30* (2013.01); *B60W 30/12* (2013.01); *B60W 30/14* (2013.01)

(58) Field of Classification Search

None

See application file for complete search history.

(56) References Cited

U.S. PATENT DOCUMENTS 6,154,688 A * 11/2000 Dominke ................ F02D 41/26 701/1
6,370,456 B2 * 4/2002 Eiting .................. G05B 19/042 701/36
6,430,478 B2 * 8/2002 Heckmann ......... G05B 19/0426 701/1
6,810,314 B2 * 10/2004 Tashiro ................ B60W 10/06 700/20

(Continued)

*Primary Examiner* — Jonathan M Dager

(74) *Attorney, Agent, or Firm* — Honigman LLP; Matthew H. Szalach

(57) ABSTRACT

A network for actuating a plurality of controllers to perform a selected functions includes a plurality of programmable chips communicatively coupled to a corresponding controller. Each programmable chip includes a software manager having a first data processing hardware and a first memory hardware. The first memory hardware stores instructions that causes the first data processing hardware to perform a primary function. An activation profile is stored in the first memory hardware and includes a list of software entities having an identifier identifying a primary function and/or a dependent function. The software manager of at least one of the plurality of controllers is further configured to process the activation profile and perform activation of the software entities by determining each of the plurality of controllers that hosts the software entities having the primary function and/or dependent function needed to perform the desired function.

20 Claims, 5 Drawing Sheets

(56) References Cited

U.S. PATENT DOCUMENTS 7,047,117 B2 * 5/2006 Akiyama .............. B60W 50/04 700/20
7,050,795 B2 * 5/2006 Wiegand ............... B60R 16/037 455/88
7,542,826 B2 * 6/2009 Hanzawa ............ G06F 15/7814 710/63
7,987,300 B2 * 7/2011 Taguchi .................. G06F 12/08 710/33
8,396,619 B2 * 3/2013 Amann .................... B60K 6/48 701/99
8,918,260 B2 * 12/2014 Boehl ..................... B60T 8/321 701/1
9,558,015 B2 * 1/2017 Schunder ................ G06F 9/445
9,841,970 B2 * 12/2017 Vangelov ................ G06F 8/654
10,606,229 B2 * 3/2020 Abe .......................... G06F 8/60
11,511,762 B2 * 11/2022 Huang ................ B60W 50/029
12,093,149 B2 * 9/2024 Grabs ................. G06F 11/2038
12,291,155 B2 * 5/2025 Song ................... B60R 16/0232
12,420,812 B2 * 9/2025 Ushiro ..................... G05B 9/03
2002/0183911 A1 * 12/2002 Tashiro ................. B60W 10/06 701/53
2007/0050095 A1 * 3/2007 Nelson ................ B60R 16/0231 701/1
2011/0225416 A1 * 9/2011 Quinn ..................... H04L 67/34 713/100
2012/0320793 A1 * 12/2012 Balbierer .............. H04L 12/462 370/254
2014/0078889 A1 * 3/2014 Diab ....................... H04L 67/63 370/221
2016/0031388 A1 * 2/2016 Grimm .................. B60K 35/90 701/36
2016/0112517 A1 * 4/2016 Wilson .................... H04L 67/10 717/178
2016/0321148 A1 * 11/2016 Lassini ............... G06F 11/2041
2017/0242688 A1 * 8/2017 Yu ........................... H04L 67/34
2018/0060196 A1 * 3/2018 Samii .................... G06F 9/4806
2019/0034566 A1 * 1/2019 Ting ...................... G06F 30/367
2019/0100105 A1 * 4/2019 Liu ......................... B60L 15/20
2019/0137940 A1 * 5/2019 Jentz .................... G07C 5/0808
2019/0268237 A1 * 8/2019 Kulkarni ............... H04L 41/122
2019/0381895 A1 * 12/2019 Shindo ................ B60L 15/2081
2020/0324782 A1 * 10/2020 Saers ........................ G06F 8/65
2022/0041058 A1 * 2/2022 Nemeth ................ B60W 10/20
2023/0084842 A1 * 3/2023 Ng .......................... H04W 4/50 701/32.7
2023/0264641 A1 * 8/2023 Staudt ................... B60R 16/023 701/22

* cited by examiner

Discovery Mapping Information Relating swEntity to its Host Location

| Mapping table | | |
| --- | --- | --- |
| Software Entity | Host Location | SM Host Location |
| A | 172.16.4.2 | 172.16.4.1 |
| B | 172.16.4.5 | 172.16.4.1 |
| C | 172.16.4.7 | 172.16.4.1 |
| D | 172.16.4.4 | 172.16.4.1 |
| E | 172.16.4.10 | 172.16.2.1 |
| F | 172.16.4.2 | 172.16.2.1 |
| G | 172.16.4.9 | 172.16.2.1 |

26

Hw Component
Hw Component
swEntity

NETWORK HAVING SOFTWARE ENTITIES FOR ACTUATING CONTROLLERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a network having a plurality of controllers for performing a desired function. A network includes a plurality of controllers which are programmed to perform a function. Each of the controllers are connected to each other by various communication lines. The communication lines may operate using different protocols. For instance, some of the communication lines may be a bus bar, in which case the controllers are connected to each other by the bus bar and communicate with each other using a Controller Area Network ("CAN") protocol. Some of the communication lines may be an Ethernet® line, in which case the controllers communicate with each other using an Ethernet protocol.

The controllers are actuated by a software program which is configured to perform steps and processes for effectuating a predetermined function. In addition, the predetermined function may require the actuation of other controllers. For example, in a vehicle application, a controller for performing an Advanced Driver Assistance ("ADA") function requires controllers which perform propulsion, braking, steering and the like.

Currently, each controller is programmed with the address of the other controllers required to perform its primary or subordinate function. Thus, if a new controller is added to the network, each controller which requires the use of the new controller must be updated to include the address of the new controller. As such, updating a network may require substantial updating and planning as the location of the added controller and the identity of each of the controllers which require the activation of the added network must be known. Further, as the controllers are programmed to carry out a predetermined routine requiring the actuation of predetermined controllers, it may be that controllers are actuated that are not needed for the performance of a particular function which increases power consumption as controllers or programs that are not needed are automatically operated.

Accordingly, it is desirable to have a network architecture which provides for a dynamic addition of controllers without the need to update or otherwise share the address of the added controller with all the controllers in the network and reduce power consumption by only utilizing dependent functions needed to operate a selected function.

SUMMARY

In one aspect, a network for actuating a plurality of controllers to perform one of a plurality of selected functions is provided. The controllers are communicatively coupled to each other by a network of communication lines. The network includes a plurality of programmable chips communicatively coupled to a corresponding controller, the programmable chip having a software manager. The software manager includes a first data processing hardware and a first memory hardware. The first memory hardware stores instructions that when executed on the first data processing hardware cause the first data processing hardware to perform a primary function. An activation profile is stored in the first memory hardware and includes a list of software entities having at least one identifier each of the at least one identifier being a primary function and/or a dependent function. The software manager of the controllers is further configured to process the activation profile and perform activation of the software entities by determining each of the plurality of controllers that hosts the software entities having the primary function and/or dependent function needed to perform the desired function so as to allow the software entities to be deployed flexibly.

In one aspect, each of the activation profiles may include a discoverable software entity identifier configured to discover an address of each of the plurality of controllers having the primary function and/or dependent function needed to perform the desired function. A content of the activation profile of each of the plurality of controllers having the primary function and/or dependent function needed to perform the desired function may be known only by the software manager on the controller configured to activate the activation profiles.

In one aspect, the software manager on one controller is configured to request an activation of an activation profile managed by another software manager via a network communication in order to activate a dependent function, and the requested software manager is configured to send a response to the requesting software manager so that the requesting software manager can take appropriate actions.

In one aspect, the software manager of the controller performing the desired function may be further configured to stop the controllers performing the desired function disposed locally and deactivates the activation profile of each of the other plurality of controllers having a primary function and/or dependent function necessary to perform the desired function.

In one aspect, each of the plurality of controllers may further include a power manager, the power manager including a set of instructions stored on the first memory hardware that when executed on the first data processing hardware cause the first data processing hardware to transmit a signal to wake up each of the other plurality of controllers having a primary function and/or dependent function necessary to perform the desired function.

In one aspect, after the software manager processes the activation profile and determines the address of each of the plurality of controllers required to perform the primary and dependent functions, the software manager makes a request to the power manager to power on the identified controllers using the address of the controllers. Further, each of the power managers may be configured to provide a confirmation to a corresponding software manager that one of the controllers is already awake. In such an aspect, each of the power managers may be configured to generate an activation path and execute an activation command configured to activate any remote controller requested by the software manager, wherein the activation command will wake up a multitude of intermediate controllers along the activation path, the activation command further configured to have each of the intermediate controllers automatically forward the activation request to the next controller in the path. In such an aspect, an activation mechanism along the activation path may be at least one of an Ethernet wakeup, a controller area network wakeup and a General Purpose IO based wakeup.

In yet another aspect, a network for use in a vehicle is provided. The network is configured to perform a plurality of vehicle functions and includes a plurality of controllers to perform the plurality of vehicle functions. The plurality of controllers are communicatively coupled to each other by a network of communication lines. The network includes an input and each of the plurality of controllers being a programmable chip. The input is configured to select at least one of the plurality of vehicle functions and each programmable chip has a software manager, a power manager, a first data processing hardware and a first memory hardware. The first memory hardware stores instructions that when executed on the first data processing hardware causes the first data processing hardware to perform a primary function. The power manager includes a set of instructions stored in the first memory that when executed on the first data processing hardware causes the first data processing hardware to transmit a signal to wake up each of the other plurality of controllers having a primary function and/or dependent function necessary to perform the desired function. An activation profile is stored in the first memory hardware. The activation profile includes a list of software entities having at least one identifier each of the at least one identifier being a primary function and/or a dependent function. At least one of the software managers is configured to perform a selected vehicle function received from the input and processes the activation profile and perform activation of the software entities by determining each of the plurality of controllers that hosts the software entities having the primary function and/or dependent function needed to perform the selected vehicle function.

In one aspect, each of the activation profile includes a discoverable software entity identifier configured to discover an address of each of the plurality of controllers having the primary function and/or dependent function needed to perform the desired function. In such an aspect, a content of the activation profiles of each of the plurality of controllers having the primary function and/or dependent function needed to perform the desired function is known only by the software manager on the controller configured to activate the activation profiles.

In one aspect, the software manager on one controller is configured to request an activation of an activation profile managed by another software manager via a network communication in order to activate a dependent function.

In one aspect, the software manager of the controller performing the desired function is further configured to first stop the controllers performing the desired function disposed locally and then subsequently deactivates the activation profile of each of the other plurality of controllers having a primary function and/or dependent function necessary to perform the desired function.

In one aspect, each of the plurality of controllers further include a power manager, the power manager having a second data processing hardware and a second memory hardware, the second memory hardware storing instructions that when executed on the second data processing hardware cause the second data processing hardware to transmit a signal to wake up each of the other plurality of controllers having a primary function and/or dependent function necessary to perform the desired function. In such an aspect, after the software manager processes the activation profile and determines the address of each of the plurality of controllers necessary to perform the primary and dependent functions, the software manager makes request to the power manager to power on this plurality of controllers based on the address of the controllers. In another aspect, the plurality of vehicle functions includes advanced driver assistance, lane keep assist, adaptive cruise control, cruise control, and climate control.

In yet another aspect, a method for activating a plurality of controllers interconnected to each other in a network by a plurality of communication lines to performed a desired function is provided. The method includes the step of providing each of the plurality of controllers with a software manager and a power manager. The software manager includes a first data processing hardware and a first memory hardware. The first memory hardware stores instructions that when executed on the first data processing hardware causes the first data processing hardware to perform a primary function. The power manager includes a set of instructions stored on the first memory hardware that when executed on the first data processing hardware causes the first data processing hardware to transmit a signal to wake up each of the other plurality of controllers having a primary function and/or dependent function necessary to perform the desired function. The method includes the step of providing each of the plurality of controllers with an activation profile stored in the first memory hardware, the activation profile includes a list of software entities represented by at least one identifier each of the at least one identifier being a primary function and/or a dependent function. The method includes the step of activating the activation profile to identify each of the software entities having a primary and/or dependent function required to perform the desired function. The method includes the step of processing the activation profile of each of the controllers in the plurality of having a primary and/or dependent function required to perform the desired function to determine an address of each of the plurality of having a primary and/or dependent function required to perform the desired function. The method includes the steps of transmitting the address of each of the plurality of having a primary and/or dependent function required to perform the desired function to the power manager and generating an activation path defining a path for transmitting the signal to each of the plurality of controllers having a primary function and/or dependent function necessary to perform the desired function. The method further includes the step of transmitting the signal along the activation path so as to wake up the plurality of controllers having a primary function and/or dependent function necessary to perform the desired function.

In one aspect, the method may further include the step of first stopping the controller performing the desired function when a stop command is received, then subsequently deactivating the activation profile of the controller performing the desired function and the subsequently deactivating the activation profile of each of the other plurality of controllers having a primary function and/or dependent function necessary to perform the desired function.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
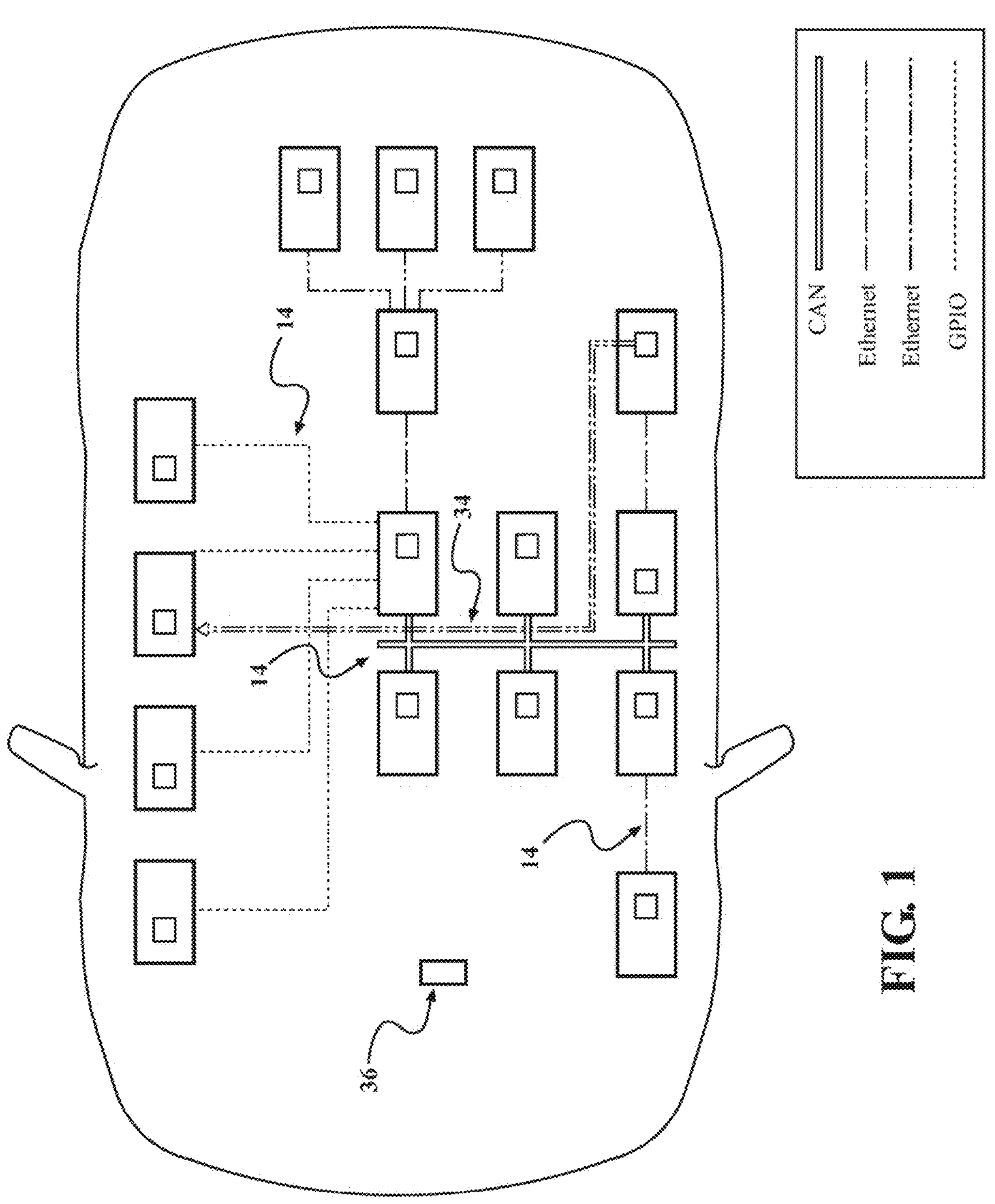
FIG. 1 is a schematic depiction of a network having different communication lines.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A network for actuating a plurality of controllers to perform one of a plurality of selected functions is provided. The network includes a plurality of programmable chips each having a software manager configured to activate an activation profile having a list of software entities identifying a primary function and/or a dependent function to determine which of the controllers that hosts the software entities having the primary function and/or dependent function are needed to perform the desired function. As used herein, the term “activate an activation profile” means that desired software entities are turned on and operating so as to perform the primary function and/or dependent function as the case may be. Further, the communication of the software is enabled. In some instances, the software entity may have a factory setting where the communication is always enabled so as to be able to receive signals within the network, in which case activating the activation profile simply turns on the respective software entity. In instances where the software entity is disabled, the activating the activation profile enables the communication of the software entity. Further, a power manager processes the activation profile to determine a location of each of the controllers and software entities needed to perform the selected function. Accordingly, the network architecture provides a dynamic discovery feature that allows for the addition of controllers without the need to update or otherwise share the address of the added controller with all of the controllers in the network and reduces power consumption by only utilizing dependent functions needed to operate a selected function.

With reference now to FIG. 1, a schematic diagram of a network 10 is provided. The network 10 includes a plurality of controllers 12, each controller 12 is configured to perform a primary and/or dependent function. For illustrative purposes, the network 10 is described in the context of a vehicle 100. For illustrative purposes, the vehicle 100 is shown as being an automotive vehicle, but the principles herein are applicable to other types of vehicles such as aircraft, boats, trains and the like. However, it should be appreciated that the principles of the network 10 may be applied to other platforms aside from a vehicle without deviating from the scope of the appended claims. The controllers 12 are communicatively coupled to each other by a network 10 of communication lines 16. Any communication line 16 currently known or later developed may be modified and incorporated herein. For illustrative purposes, the controllers 12 are shown connected to each other directly, or indirectly, through an Ethernet line, a Controller Area Network 10 (“CAN”) line, and an electric line or trace. As is known, the communication for each line may be governed by a protocol. Thus, CAN protocol is used to transmit signals for the controllers 12 connected to the CAN line; and Ethernet protocol is used to transmit signals for controllers 12 connected to the Ethernet line; General Purpose IO (GPIO) protocol is used to transmit signals for controllers 12 connected to the electric line.

The network 10 includes a plurality of programmable chips 16 communicatively coupled to a corresponding controller 12. For illustrative purposes, each of the programmable chips 16 are shown residing within a respective controller 12. However, it should be appreciated that the programmable chips 16 may reside in the controller 12 itself or may be remote of the controller 12 as part of a printed circuit board. For instance, a plurality of programmable chips 16 may be disposed on the printed circuit board of a master control unit (not shown).

Figure 2:
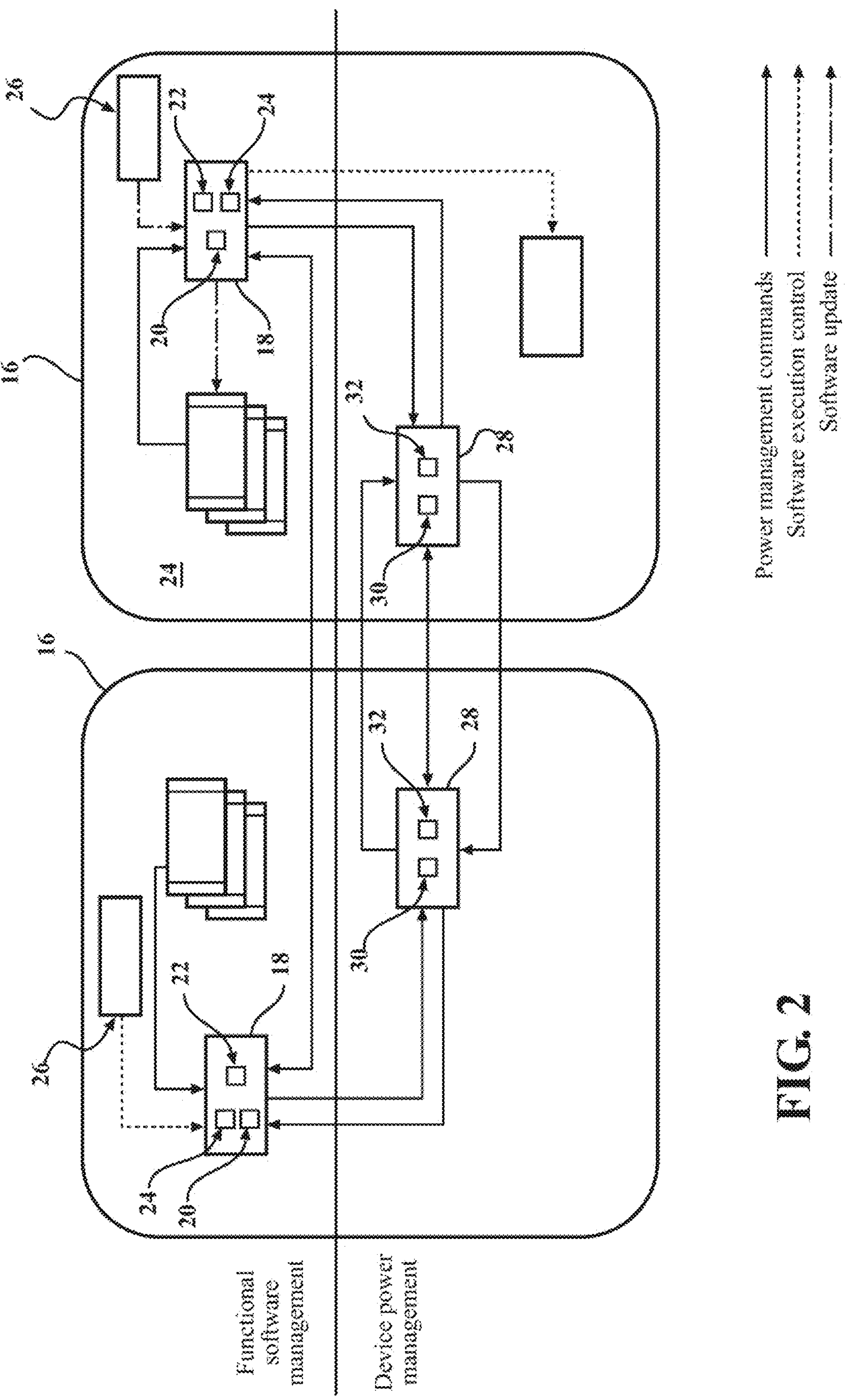
FIG. 2 is a schematic depiction of a programmable chip in accordance with the principles of the present disclosure.

With reference now to FIG. 2, each programmable chip 16 includes at least one software manager 18. The software manager 18 is configured to determine the software program required to perform a selected function. For instance, in the context of an automobile and assuming the selected primary function is lane assist, vehicle functions such as steering, propulsion, braking, lighting and sound may be required. In such a case, the software program provides the instructions for actuating the physical mechanism/motors to perform such functions. The software manager 18 includes a first data processing hardware 20 and a first memory hardware 22. The first memory hardware 22 stores instructions that when executed on the first data processing hardware 20 causes the first data processing hardware 20 to perform a primary function and/or dependent function.

Figure 3:
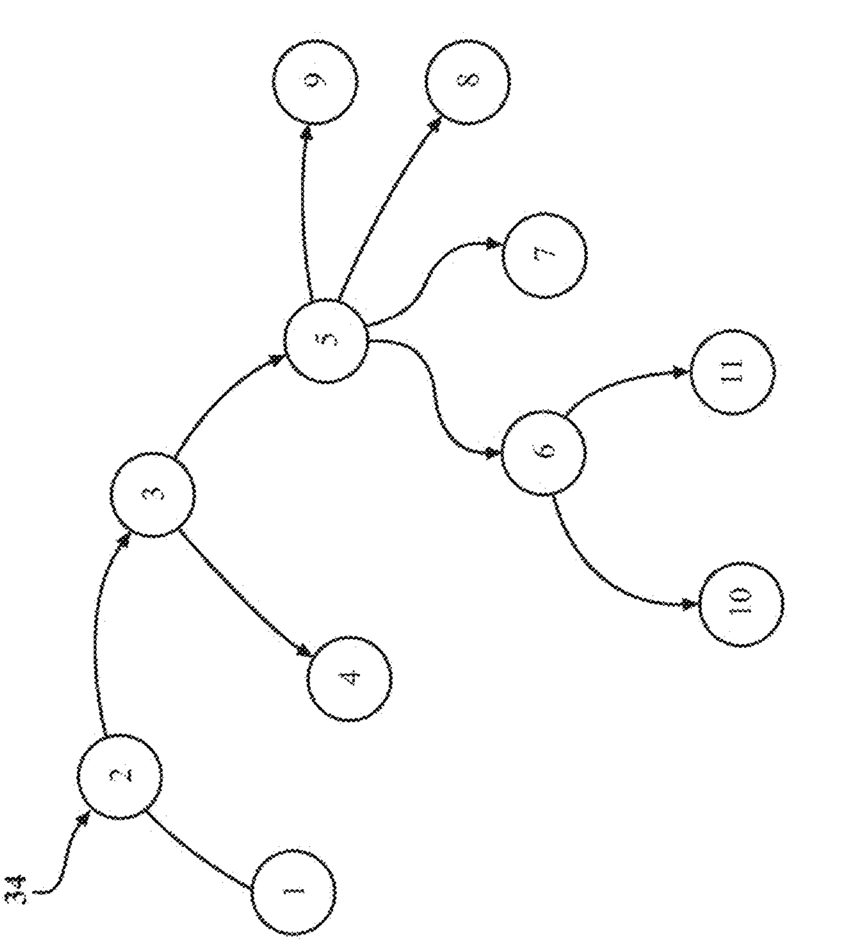
FIG. 3 is a schematic depiction illustrating the function of a software manager of the programmable chip shown in FIG. 2.

An activation profile 24 is configured to provide a list of software entities required to perform the function the controller 12 was designed to perform. The activation profile 24 is stored in the first memory hardware 22 and the software entities may be an identifier identifying a primary and/or dependent function of the network 10. For instance, the activation profile 24 for a software manager 18 responsible for executing a lane assist function will have a list of the software entities which perform functions, e.g. has the software program, needed for lane assist, e.g. a steering function, a lighting function, a braking function, a sound function and the like. In such an example, the identifier of the software entities may be "steering," "lighting," "braking," "sound," and the like. FIG. 3 provides an illustrative example of an activation profile 24 which includes a list of software entities, which are given a generic nomenclature for illustrative purposes. As shown in the table, the identifiers are "A," "B," "C," "D," "E," "F," and "G."

The software manager 18 is further configured to process the activation profile 24 and perform activation of the software entities having the primary function and/or dependent function needed to perform the desired function. As described above, in instances where the communication of the software entity is disabled, the communication is enabled. Each activation profile 24 may include a discoverable software entity identifier configured to discover an address of each of the plurality of controllers 12 having the primary function and/or dependent function needed to perform the desired function. For instance, the activation profile 24 may include a look-up table 26 which associates the address of the location of the controller 12 as well as the location of the software managers 18 hosting the software entities required to perform the selected function.

A content of the activation profile 24 of each of the plurality of controllers 12 having the primary function and/or dependent function needed to perform the desired function may be known only by the software manager 18 on the controller 12 configured to activate the activation profiles 24. Thus, the programming of the programmable chips 16 and processing requirements of the programmable chips 16 are reduced relative to current networks where the address of each of the controllers 12 and software entities are written so as to be predetermined and fixed. Further, the power consumption of the network 10 is reduced as only the required software entities are activated relative to current networks which operate all the software entities written in the programmable chip 16.

Figure 4:
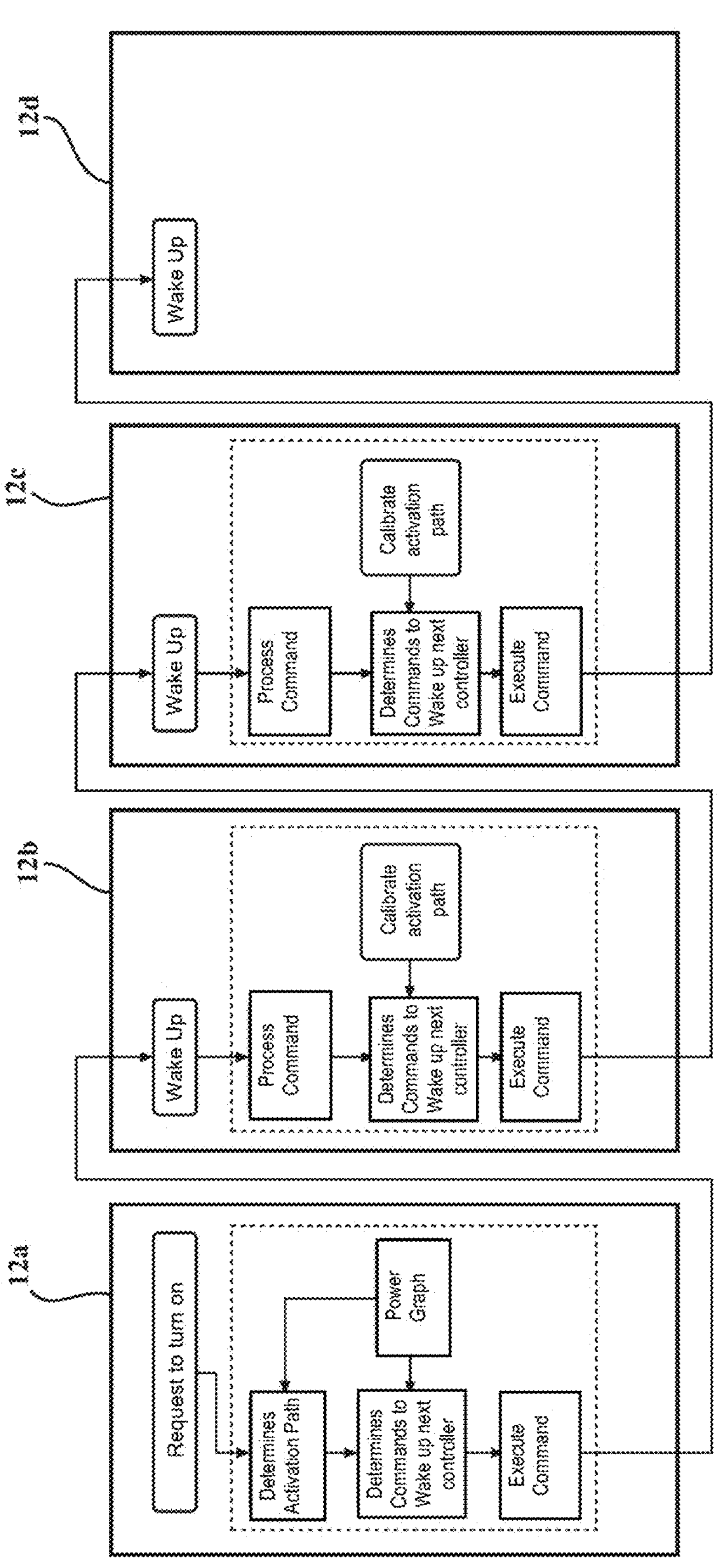
FIG. 4 is a schematic depiction illustrating the operation of the power manager of the programmable chip shown in FIG. 2.

With reference again to FIG. 2 and now to FIG. 4, a description of the activation of an activation profile 24 is provided. With reference first to FIG. 2, a pair of programmable chips 16 are connected to each other by a plurality of communication lines 14 which may be printed electric traces of a circuit board. One of the programmable chips 16 receives a command to perform a function, in which case the software manager 28 residing in said programmable chip 28 processes the activation profile 24 to determine which of the software entities are needed to perform the desired function. Each of the required software entities are activated and their software manager may transmit a signal indicating the status of the software entity; accordingly, the requesting software manager is able to know the status of its request. For instance, the signal may be an acknowledgement of the status of the software entity, e.g., activating, activated, deactivating, inactive, request not processed, in which case the requesting software manager is able to determine if another request is required.

A depiction of the activation of an activation profile 24 in controller **12*b* that is initiated by another controller 12*a* is shown in FIG. 4. In particular, FIG. 4 provides an example where the controller 12*a* receives a request to activate, wherein the software manager 18 processes the activation profile 24 to determine which software entities are needed. For illustrative purposes, it is assumed that activation profile 24 includes software entity-1 and software entity-2, wherein software entity-1 is a primary function and software entity-1 is disposed locally on the controller 12*a* and software entity-2 is a dependent function and disposed on controller 12*c*, with controller 12*b* interposed on a communication line 14 between controller 12*a* and 12*c*. The software manager 18 on controller 12*a* is configured to request an activation of an activation profile 24 managed by the software manager 18 on controller 12*c* along the communication line 14 in order to activate software entity-2** and perform the dependent function.

In some aspects, the software entities required may reside locally within the software manager 18. In some instances, the software entities are located in a software manager 18 of a different controller 12, or reside elsewhere on the network 10. FIG. 4 provides an example where the primary software entity (software entity-1) is disposed locally on the controller 12, and the dependent software entity (software entity-2) is disposed on a different controller 12 connected to the network 10. However, it should be appreciated that the dependent software entity may also be disposed locally on the controller 12 or remote of the controller 12. The programmable chip 16 may include numerous software entities, in which case each software entity written on the programmable chip 16 is considered to be local. In one aspect, the software manager 18 of the controller 12 performing the desired function may be further configured to first stop the controllers 12 performing the desired function disposed locally and then subsequently deactivate the activation profile 24 of each of the other plurality of controllers 12 in the network 10 having a primary function and/or dependent function necessary to perform the desired function.

The activation profile contains software entities, some of which may be discoverable services without any hard coding of the controller actuating the software entities. In particular, the software entities are discoverable using known protocol for network communication such as SOME/IP. In one vehicle platform, a software entity may reside in a first controller and that same software entity may reside in a second controller in a different vehicle platform. Thus, conventional design requires that the IP address of the controller is hard coded thus each vehicle function requires an activation of predetermined controllers which is hard coded into controllers. However, the activation profile includes software entities which are discoverable, and thus the same network may be utilized in different vehicle platforms without needing to identify the IP address of each of the controllers, so as to eliminate the need to revise the hard coding. In other words, the software entities may be deployed to a different controller, (either dynamically or statically per different vehicle configurations) without the need to perform a configuration change to the controller to activate the software entities.

It should be appreciated that software manager 18 need not necessarily reside with the controller 12*a*. FIG. 4 depicts an instance where the activation profile 24 lists software entity-1 and software entity-2. In which case, the software manager 18 on controller 12*a* obtains the address of software entity-1 and determines that the software manager 18 of software entity-2 based on the address of software entity-2 and the type of software entity-2. For example, if software entity-2 is a mechatronic function, the software manager 18 address is the same as the address of the software entity-2. However, if the software entity-2 is a compute software function, the address of the software manager 18 for software entity-2 may not necessarily reside with a controller 12 but may reside in a printed circuit board of a master control unit.

With reference again to FIGS. 2 and 3, each of the plurality of controllers 12 may further include a power manager 28. The power manager 28 is a software program configured to turn on and off a controller 12. The power manager 28 includes a second data processing hardware 30 and a second memory hardware 32. For illustrative purposes, the second data processing hardware 30 and the second memory hardware 32 are shown as being separate circuits from the first data processing hardware 20 and the first memory hardware 22; however, it should be appreciated that the second data processing hardware 30 and the first data processing hardware 20 may be a single data processing hardware and the first memory hardware 22 and the second memory hardware 32 may be a single memory hardware. The second memory hardware 32 stores instructions that when executed on the second data processing hardware 30 cause the second data processing hardware 30 to transmit a signal to wake up each of the other plurality of controllers 12 having a primary function and/or dependent function necessary to perform the desired function. Accordingly, the power manager 28 is configured to turn on each controller 12 having a software entity identified in the activation profile 24.

FIG. 2 illustrates an operation of the programmable chip 16 wherein the software manager 18 makes a request to the power manager 28 to power on the identified controllers 12 using the address of the controllers 12. As discussed above, the address is determined after the software manager 18 processes the activation profile 24 and determines the software entities required to perform the primary and dependent functions and the address of the software entity of each controller 12 is listed in the activation profile 24. Further, each of the power managers 28 may be configured to provide a confirmation to a corresponding software manager 18 that one of the controllers 12 is already awake.

With reference again to FIG. 3, the power manager 28 may be configured to process the address of each of the software entities to generate an activation path 34 and execute an activation command configured to activate any remote controller 12 requested by the software manager 18. As an example, the activation path 34 is illustratively shown as a path interconnecting software entities "A," "B," "C," "D," and "E." Each of the software entities is associated with a controller location and a software manager location. As shown, some of the software managers 18 are co-located as evidenced by having the same address and others are located at different addresses. Likewise, two of the controllers 12 are located at the same address while others have different addresses. The table is illustrative of an aspect where the software entities are not necessarily located with the controller 12. FIG. 3 also depicts the dependencies of the software entities, in which case software entity "A" serves as a primary function and software entities "B," "C," "D," and "E" are dependent functions, e.g. functions necessary for to carry out the primary function, otherwise stated, software entity "A" requires the operation of software entities "B," "C," "D," and "E."

With reference again to FIGS. 1, 4, and 5, the activation command is configured to wake up each of the controllers 12*b*, 12*c*, 12*d* listed in the activation profile 24 to include any intermediate controllers 12*b*, 12*c* along the activation path 34 between the initiating controller 12*a* and the target controller 12*d*. The activation path 34 includes any of the communication lines 14 connecting the initiating controller 12 to the target controller 12. As used herein, it should be appreciated that the initiating controller 12 is performing a primary function that is received by the network 10, and the target controller 12 is any one of the controllers 12 having a software entity performing a dependent function. Thus, as shown in FIG. 1, the activation command may be transmitted along different types of communication lines 14 such as an Ethernet line, a CAN line, and a GPIO line.

Figure 5:
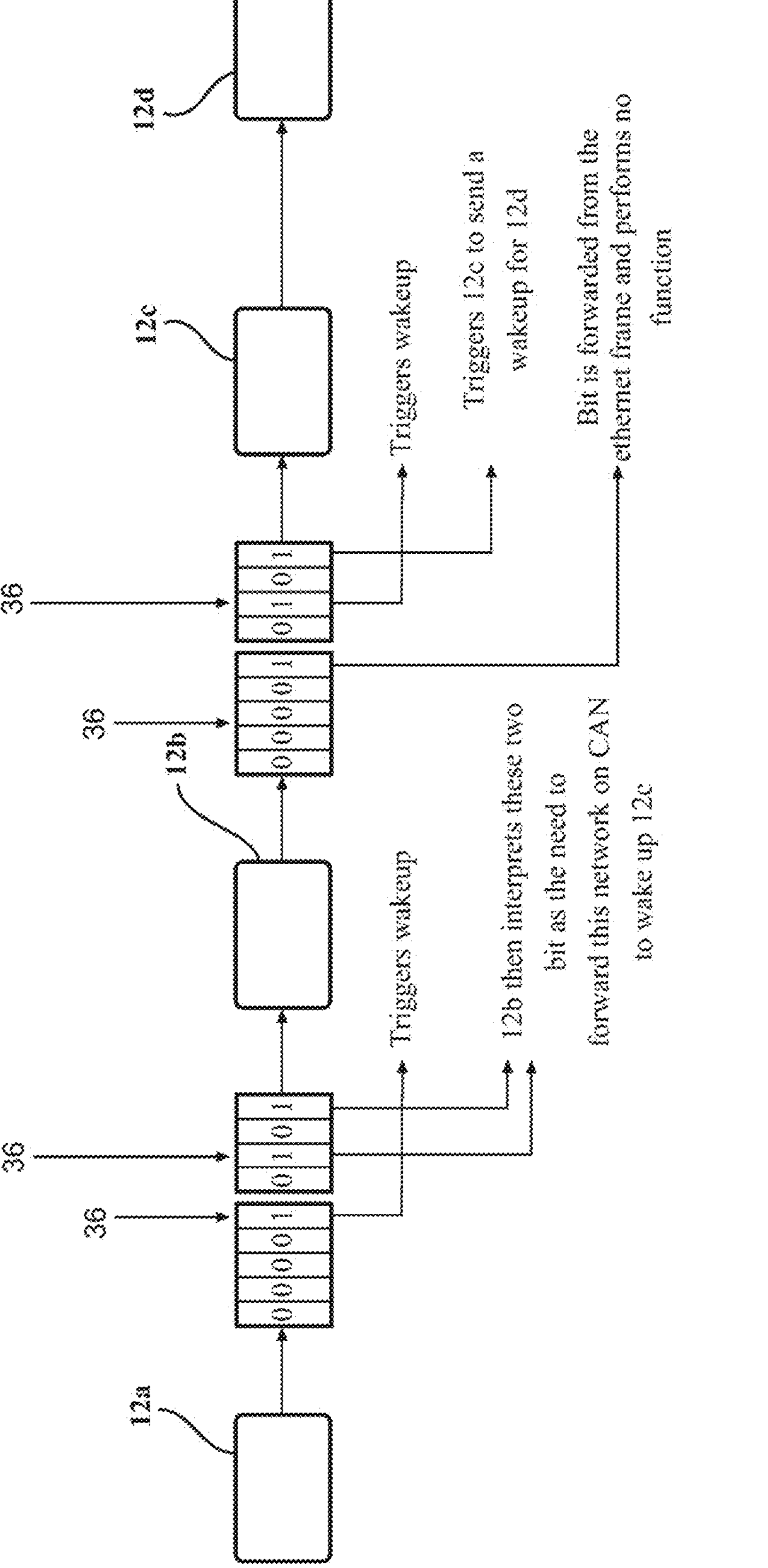
FIG. 5 is a schematic depiction illustrating the activation command of the power manger.

FIG. 5 depicts the activation command being transmitted from the initiating controller 12*a* to the target controller 12*d* through intermediate controllers 12*b*, 12*c*. Though the path from the initiating controller 12*a* to the target controller 12*b* is shown as being generally linear, it should be appreciated that the path may be through various nodes and controllers as shown in the activation path 34 shown in FIG. 2. The activation command may be further configured with instructions to have each of the intermediate controllers 12 12 automatically forward the activation request to the next controller 12 in the activation path 34. Thus, the activation command processes the activation path 34 to determine the proper command and protocol to transmit the wake-up signal along the communication lines 14 connecting the initiating controller 12 to the target controller 12. Accordingly, the activation command includes an activation mechanism for an Ethernet wakeup, a CAN wakeup and a GPIO based wakeup.

FIG. 5 depicts an instance where the activation path 34 includes an Ethernet line, a CAN line, and a GPIO line. The initiating controller 12*a* transmits an activation command to intermediate controller 12*b* through an Ethernet line, wherein the activation command is a message frame utilizing Ethernet protocol which wakes up intermediate controller 12*b* as well as an instruction to forward the message to intermediate controller 12*c* using CAN protocol. The activation command is received by intermediate controller 12*c*, which wakes up and forwards the activation command to the target controller 12*d* using GPIO protocol. In some instances, the software manager 18 and/or the software entity of a target controller 12*d* will need to remain in communication with the initiating controller 12*a*. In which case, the activation command includes instructions to keep the intermediate controllers 12*b*, 12*c* on. In other cases, the software manager 18 and/or software entity of the target controller 12 does not need to be in communication with the initiating controller 12. In which case, the activation command includes instructions to turn the intermediate controllers 12*b*, 12*c* off after the activation command has been forwarded.

With reference again to FIGS. 1, 4, and 5, an operation of the network 10 is provided, wherein the network 10 is used in a vehicle 100. In particular, the network 10 is shown used in an automotive vehicle 100. The network 10 is configured to perform a plurality of vehicle functions and includes a plurality of controllers 12 to perform the plurality of vehicle functions. For instance, the vehicle functions includes advanced driver assistance, lane keep assist, adaptive cruise control, cruise control, and climate control. Assuming for illustrative purposes, an input 36 for actuating adaptive cruise control is actuated by the driver. The input 36 may be a button located on the dashboard or an icon on a touch-screen of a head unit. The selection is transmitted to a controller 12 in the network 10 that performs the functions required for adaptive cruise control. For illustrative purposes, assume that such functions are propulsion, steering, braking, and lighting. In this example, the adaptive cruise control is the primary function and propulsion, steering, braking, and lighting are dependent functions. The software manager 18 of the controller 12 responsible for performing adaptive cruise control processes the activation profile 24 which lists the software entities required for performing adaptive cruise control, which in this case are software entities for propulsion, steering, braking, and lighting.

The software manager 18 transmits the list of software entities to the power manager 28 and the power manager 28 processes the address of each of the software entities to generate an activation path 34 and execute an activation command configured to activate the software entities and their corresponding controllers 12 as the case may be. That is, in some instances the software entity may not reside in a controller 12 but on a printed circuit board of a master control unit. An illustration of an activation path 34 is shown in FIG. 1 which may be derived from the table, also shown in FIG. 1.

The activation command is configured to wake up each of the controllers 12 listed in the activation profile 24 to include any intermediate controllers 12 along the activation path 34 between the initiating controller 12 and the target controller 12. The activation path 34 includes any of the communication lines 14 connecting the initiating controller 12 to the target controller 12, to include an Ethernet line, a CAN line, and a GPIO line. FIG. 5 depicts the activation command being transmitted from the initiating controller 12 to the target controller 12 through intermediate controllers 12. The activation command may be further configured with instructions to have each of the intermediate controllers 12 automatically forward the activation request to the next controller 12 in the activation path 34. Thus, the activation command processes the activation path 34 to determine the proper command and protocol to transmit the wake-up signal along the communication lines 14 connecting the initiating controller 12 to the target controller 12. Accordingly, the activation command includes an activation mechanism for an Ethernet wakeup, a CAN wakeup, and a WHio based wakeup. Once the target controllers 12 are turn on, or woken, the software managers 18 of each of the target controllers 12 may transmit a signal to the initiating controller 12 to inform the initiating controller 12 that the adaptive cruise control is ready for operation.

With reference again to FIGS. 2-5, a method for activating a plurality of controllers 12 interconnected to each other in a network 10 by a plurality of communication lines 14 to perform a desired function is provided. The method includes the step of providing a plurality of programmable chips 16 communicatively coupled to a corresponding one of the plurality of controllers 12. Each of the programmable chips 16 includes a software manager 18 and a power manager 28.

The software manager 18 includes a first data processing hardware 20 and a first memory hardware 22. The first memory hardware 22 stores instructions that when executed on the first data processing hardware 20 causes the first data processing hardware 20 to perform a primary function. The power manager 28 has a second data processing hardware 30 and a second memory hardware 32. The second memory hardware 32 stores instructions that when executed on the second data processing hardware 30 causes the second data processing hardware 30 to transmit a signal to wake up each of the other plurality of controllers 12 having a primary function and/or dependent function necessary to perform the desired function.

The method includes the step of providing each of the plurality of controllers 12 with an activation profile 24 stored in the first memory hardware 22. The activation profile 24 includes a list of software entities represented by at least one identifier, each of the at least one identifier being a primary function and/or a dependent function. The method includes the step of activating the activation profile 24 to identify each of the software entities having a primary and/or dependent function required to perform the desired function and processing the activation profile 24 of each of the controllers 12 in the plurality of controllers having a primary and/or dependent function required to perform the desired function to determine an address of each of the plurality of controllers having a primary and/or dependent function required to perform the desired function.

The method includes the steps of transmitting the address of each of the plurality of controllers having a primary and/or dependent function required to perform the desired function to the power manager 28 and generating an activation path 34 defining a path for transmitting the signal to each of the plurality of controllers 12 having a primary function and/or dependent function necessary to perform the desired function and transmitting the signal along the activation path 34 so as to wake up the plurality of controllers 12 having a primary function and/or dependent function necessary to perform the desired function.

The method may further include the step of first stopping the controller 12 performing the desired function when a stop command is received, then subsequently deactivating the activation profile 24 of the controller 12 performing the desired function and the subsequently deactivating the activation profile 24 of each of the other plurality of controllers 12 having a primary function and/or dependent function necessary to perform the desired function.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A network comprising:

a plurality of controllers each configured to perform one of a plurality of selected functions, controllers of the plurality of controllers communicatively coupled to each other by a network of communication lines, wherein each controller of the plurality of controllers is a programmable chip having a software manager, the software manager having a first data processing hardware and a first memory hardware, the first memory hardware storing instructions that when executed on the first data processing hardware cause the first data processing hardware to perform a primary function; and an activation profile stored in the first memory hardware, the activation profile including a list of software entities having at least one identifier, at least one identifier for each of the software entities being a primary function and/or a dependent function;

wherein the software manager of at least one of the plurality of controllers is further configured to process the activation profile and perform activation of the software entities by determining each of the plurality of controllers that hosts the software entities having the primary function and/or the dependent function needed to perform a desired function, wherein each activation profile of each of the plurality of controllers includes a discoverable software entity identifier configured to discover an address of each of the plurality of controllers having the primary function and/or the dependent function needed to perform the desired function so as to allow the software entities to be deployed flexibly.

2. The network as set forth in claim 1, wherein a content of each activation profile of each of the plurality of controllers having the primary function and/or the dependent function needed to perform the desired function is known only by the software manager on the controller configured to activate the activation profiles.

3. The network as set forth in claim 1, wherein the software manager on one controller of the plurality of controllers is configured to request an activation of an activation profile managed by another software manager via a network communication in order to activate a dependent function, and the requested software manager is configured to send a response to the requesting software manager so that the requesting software manager can take appropriate actions.

4. The network as set forth in claim 1, wherein the software manager of the controllers performing the desired function is further configured to stop the controllers performing the desired function disposed locally and deactivate the activation profile of each of the other controllers of the plurality of controllers having the primary function and/or the dependent function necessary to perform the desired function.

5. The network as set forth in claim 1, wherein each of the plurality of controllers further includes a power manager, the power manager including a set of instructions stored on the first memory hardware that when executed on the first data processing hardware causes the first data processing hardware to transmit a signal to wake up each of the other controllers of the plurality of controllers having the primary function and/or the dependent function necessary to perform the desired function.

6. The network as set forth in claim 5, wherein after the software manager processes the activation profile and determines the address of each of the plurality of controllers required to perform the primary and dependent functions, the software manager makes a request to the power manager to power on the identified controllers of the plurality of controllers using the address of the controllers.

7. The network as set forth in claim 6, wherein each of the power managers is configured to provide a confirmation to a corresponding software manager that one of the controllers is already awake.

8. The network as set forth in claim 7, wherein each of the power managers is configured to generate an activation path and execute an activation command configured to activate any remote controller requested by the software manager, wherein the activation command will wake up a multitude of intermediate controllers along the activation path, the activation command further configured to have each of the intermediate controllers automatically forward the activation request to the next controller of the intermediate controllers in the activation path.

9. The network as set forth in claim 8, wherein an activation mechanism along the activation path may be at least one of an Ethernet wakeup, a controller area network wakeup, and a General Purpose IO based wakeup.

10. A network for use in a vehicle configured to perform a plurality of vehicle functions, the network including a plurality of controllers to perform the plurality of vehicle functions, the plurality of controllers communicatively coupled to each other by a network of communication lines, the network comprising:

an input for selecting at least one of the plurality of vehicle functions;

wherein each of the plurality of controllers is a programmable chip having a software manager, a power manager, a first data processing hardware and a first memory hardware, the first memory hardware storing instructions that when executed on the first data processing hardware cause the first data processing hardware to perform a primary function, the power manager having a set of instructions stored in the first memory hardware that when executed on the first data processing hardware causes the first data processing hardware to transmit a signal to wake up each controller of the plurality of controllers having a primary function and/or a dependent function necessary to perform a desired function; and an activation profile stored in the first memory hardware, the activation profile including a list of software entities having at least one identifier, the at least one identifier for each of the software entities being a primary function and/or a dependent function;

wherein the software manager of at least one of the plurality of controllers is further configured to perform a selected vehicle function received from the input, process the activation profile, and perform activation of the software entities by determining each of the plurality of controllers that hosts the software entities having the primary function and/or the dependent function needed to perform the selected vehicle function.

11. The network as set forth in claim 10, wherein each activation profile of each of the plurality of controllers includes a discoverable software entity identifier configured to discover an address of each of the plurality of controllers having the primary function and/or the dependent function needed to perform the desired function.

12. The network as set forth in claim 11, wherein a content of the activation profiles of each of the plurality of controllers having the primary function and/or the dependent function needed to perform the desired function is known only by the software manager on the controller configured to activate the activation profiles.

13. The network as set forth in claim 10, wherein the software manager on one controller is configured to request an activation of an activation profile managed by another software manager via a network communication in order to activate a dependent function.

14. The network as set forth in claim 10, wherein the software manager of the controller performing the desired function is further configured to first stop the controllers of the plurality of controllers performing the desired function disposed locally and then subsequently deactivate the activation profile of each of the other controllers of the plurality of controllers having the primary function and/or the dependent function necessary to perform the desired function.

15. The network as set forth in claim 11, wherein after the software manager processes the activation profile and determines the address of each controller of the plurality of controllers necessary to perform the primary and dependent functions, the software manager makes a request to the power manager to power on the necessary controllers of the plurality of controllers needed to perform the primary and dependent functions based on the address of the necessary controllers.

16. The network as set forth in claim 15, wherein the plurality of vehicle functions includes advanced driver assistance, lane keep assist, adaptive cruise control, cruise control, and climate control.

17. A method for activating a plurality of controllers interconnected to each other in a network by a plurality of communication lines to perform a desired function, the method comprising the steps of:

providing each controller of the plurality of controllers with a software manager and a power manager, the software manager having a first data processing hardware and a first memory hardware, the first memory hardware storing instructions that when executed on the first data processing hardware cause the first data processing hardware to perform a primary function, the power manager having a set of instructions stored on the first memory hardware that when executed on the first data processing hardware cause the first data processing hardware to transmit a signal to wake up each of the other controllers of the plurality of controllers having a primary function and/or a dependent function necessary to perform a desired function;

providing each controller of the plurality of controllers with an activation profile stored in the first memory hardware, the activation profile including a list of software entities represented by at least one identifier, the at least one identifier for each of the software entities being a primary function and/or a dependent function;

activating the activation profile to identify each of the software entities having the primary function and/or the dependent function required to perform the desired function;

processing the activation profile of each controller of the plurality of controllers having the primary function and/or the dependent function required to perform the desired function to determine an address of each controller of the plurality of controllers having the primary function and/or the dependent function required to perform the desired function;

transmitting the address of each controller of the plurality of controllers having the primary function and/or the dependent function required to perform the desired function to the power manager;

generating an activation path defining a path for transmitting the signal to each controller of the plurality of controllers having the primary function and/or the dependent function necessary to perform the desired function; and transmitting the signal along the activation path so as to wake up controllers of the plurality of controllers having the primary function and/or the dependent function necessary to perform the desired function.

18. The method as set forth in claim 17, further including the step of first stopping the controller performing the desired function when a stop command is received, then subsequently deactivating the activation profile of the controller performing the desired function and subsequently deactivating the activation profile of each of the other controllers of the plurality of controllers having the primary function and/or the dependent function necessary to perform the desired function.

19. The network as set forth in claim 1, wherein the activation profile is configured to execute a lane assist function.

20. The network as set forth in claim 10, wherein each power manager of the plurality of controllers is configured to generate an activation path and execute an activation command configured to activate any remote controller requested by the software manager, wherein the activation command will wake up a multitude of intermediate controllers along the activation path.

* * * * *